(12) United States Patent
Benoit

(10) Patent No.: US 7,000,495 B2
(45) Date of Patent: Feb. 21, 2006

(54) ACTUATOR DEVICE WITH INTERMEDIATE ROLLERS

(75) Inventor: Laurent Benoit, La Chavanne (FR)

(73) Assignee: Transrol, Chamberry Cedex (FR)

( * ) Notice: Subject to any disclaimer, the term of this patent is extended or adjusted under 35 U.S.C. 154(b) by 307 days.

(21) Appl. No.: 10/392,175

(22) Filed: Mar. 20, 2003

(65) Prior Publication Data
US 2004/0031341 A1 Feb. 19, 2004

(30) Foreign Application Priority Data
Mar. 20, 2002 (FR) ................................ 02 03489

(51) Int. Cl.
*F16H 1/18* (2006.01)
(52) U.S. Cl. ............................... 74/424.92; 74/424.89
(58) Field of Classification Search ............. 74/424.91, 74/424.92, 424.89, 424.71
See application file for complete search history.

(56) References Cited

U.S. PATENT DOCUMENTS

| | | | | |
|---|---|---|---|---|
| 2,831,363 A | * | 4/1958 | Lohr | 74/424.92 |
| 2,966,077 A | * | 12/1960 | Wise | 475/196 |
| 3,014,379 A | * | 12/1961 | Wise | 74/424.92 |
| 3,178,957 A | * | 4/1965 | Martens | 74/424.92 |
| 3,226,809 A | * | 1/1966 | Herve | 29/893.31 |
| 4,033,194 A | * | 7/1977 | Stanley | 74/424.92 |
| 4,375,770 A | * | 3/1983 | Druet | 74/424.92 |
| 5,373,751 A | * | 12/1994 | Katahira | 74/89.32 |
| 5,735,174 A | * | 4/1998 | Enomoto | 74/89.32 |
| 5,937,699 A | * | 8/1999 | Garrec | 74/89.35 |
| 6,026,696 A | * | 2/2000 | Hehl | 74/424.92 |
| 6,143,425 A | * | 11/2000 | Tanaka et al. | 428/627 |
| 2003/0101836 A1 | * | 6/2003 | Butsch et al. | 74/424.92 |

FOREIGN PATENT DOCUMENTS

| | | |
|---|---|---|
| DE | 1 931 861 | 1/1970 |
| DE | 87 02 656.2 U1 | 10/1987 |
| JP | 59147151 | 8/1984 |

\* cited by examiner

*Primary Examiner*—David Fenstermacher
(74) *Attorney, Agent, or Firm*—Young & Thompson

(57) ABSTRACT

Actuator device comprising a support (2); a longitudinal drive rod (8), part of the rear end (9) of which is mounted and rotates inside the support, and of which a front end section (17) has an external screw thread (18) and on its annular section, gear teeth (19); a longitudinal sheath (39) positioned around and coaxially to the drive rod has an internal screw thread; a series of rollers (28) positioned longitudinally between the drive rod and the sheath and having an external screw thread engaged with the external screw thread of the drive rod and with the internal screw thread of the sheath, and gear teeth engaged with the gear teeth of the drive rod. The helix angle of the screw thread of the rollers is equal to the screw thread helix angle of the screw thread of the drive rod, and different from the helix angle of the screw thread of the sheath.

20 Claims, 8 Drawing Sheets

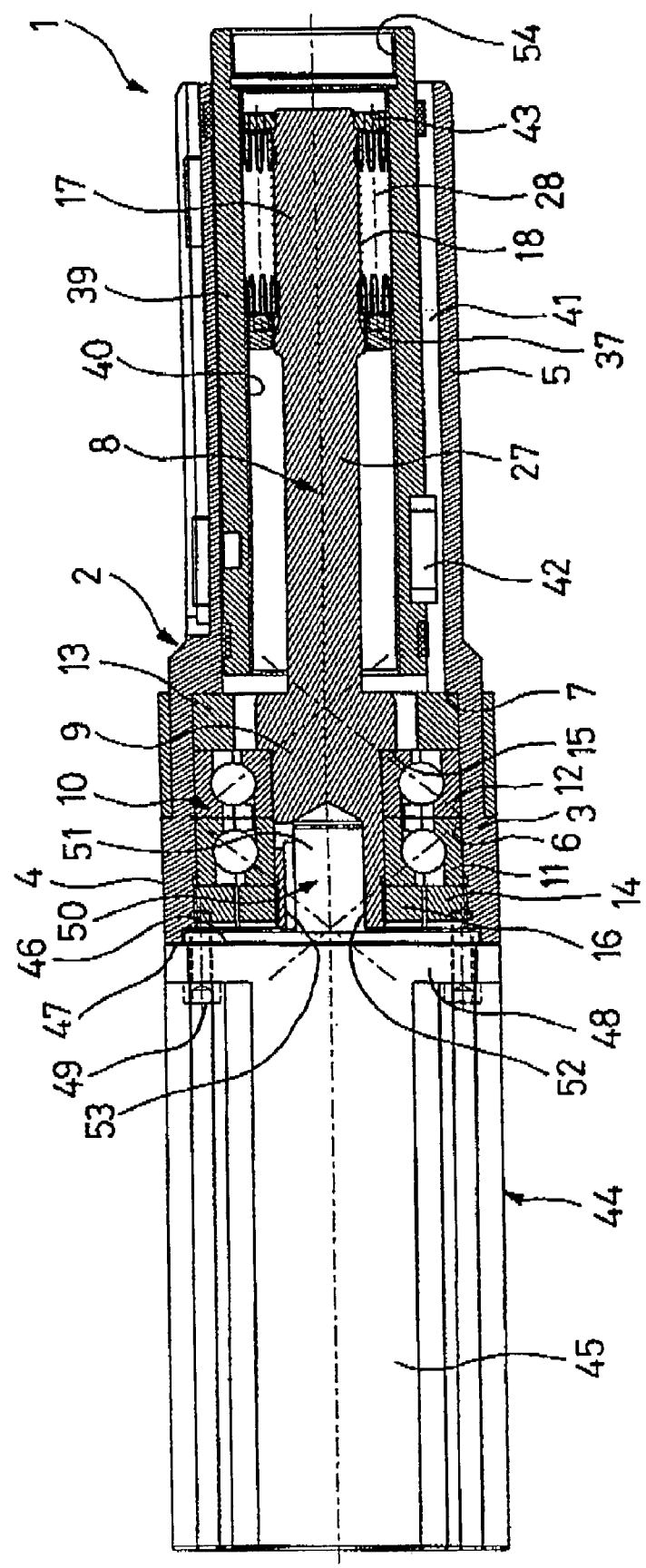
FIG_1

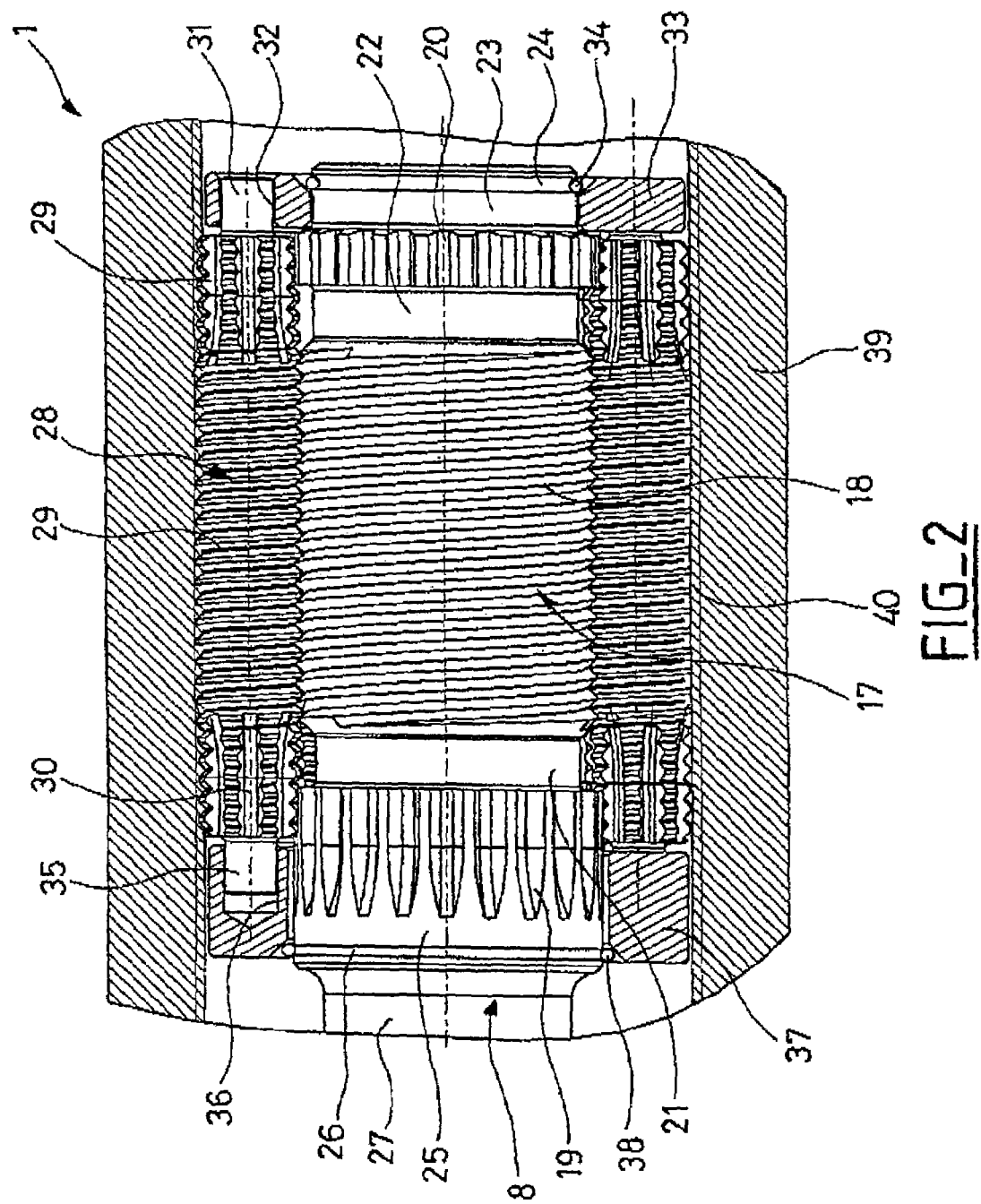
FIG_2

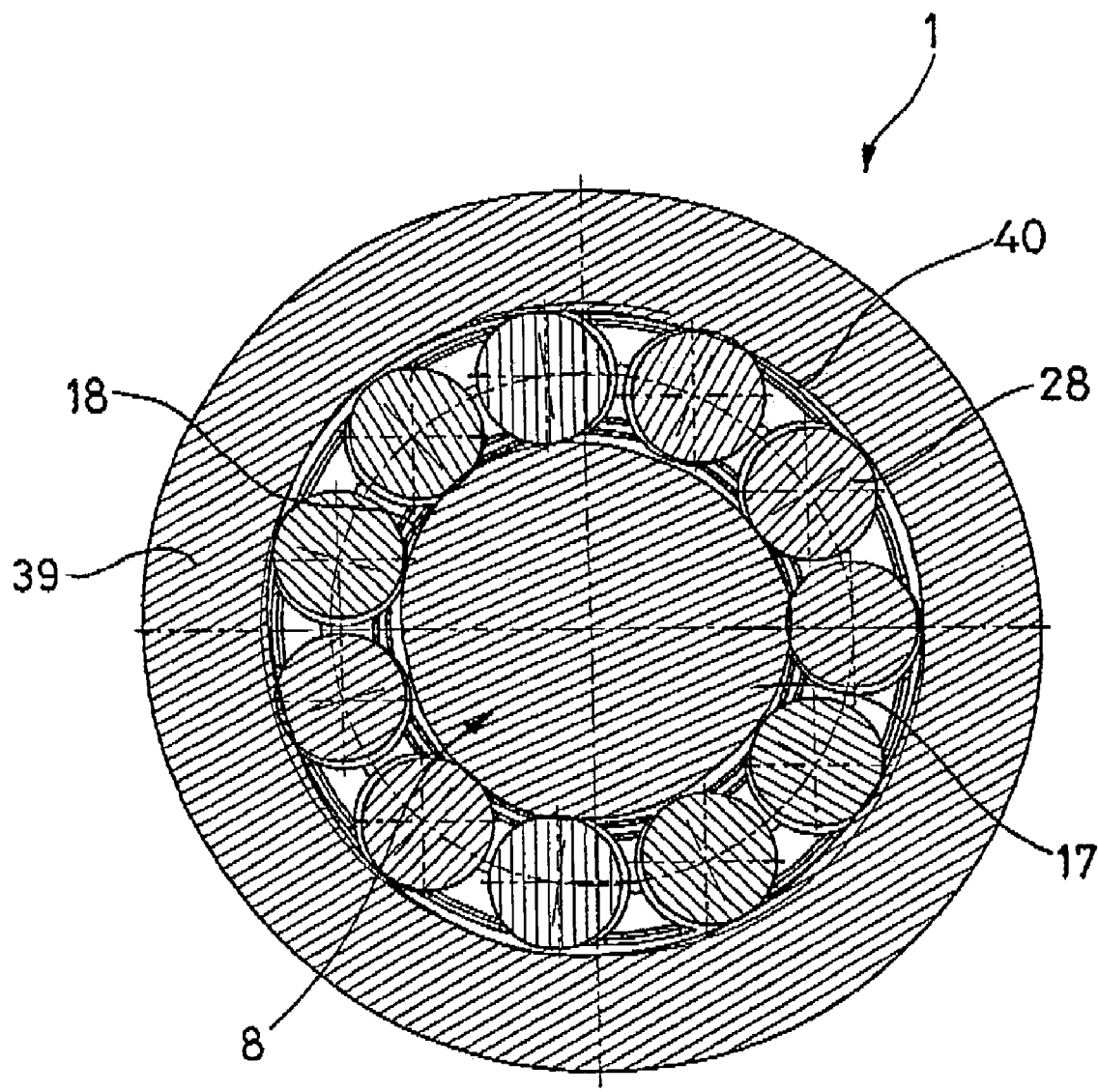

FIG_4
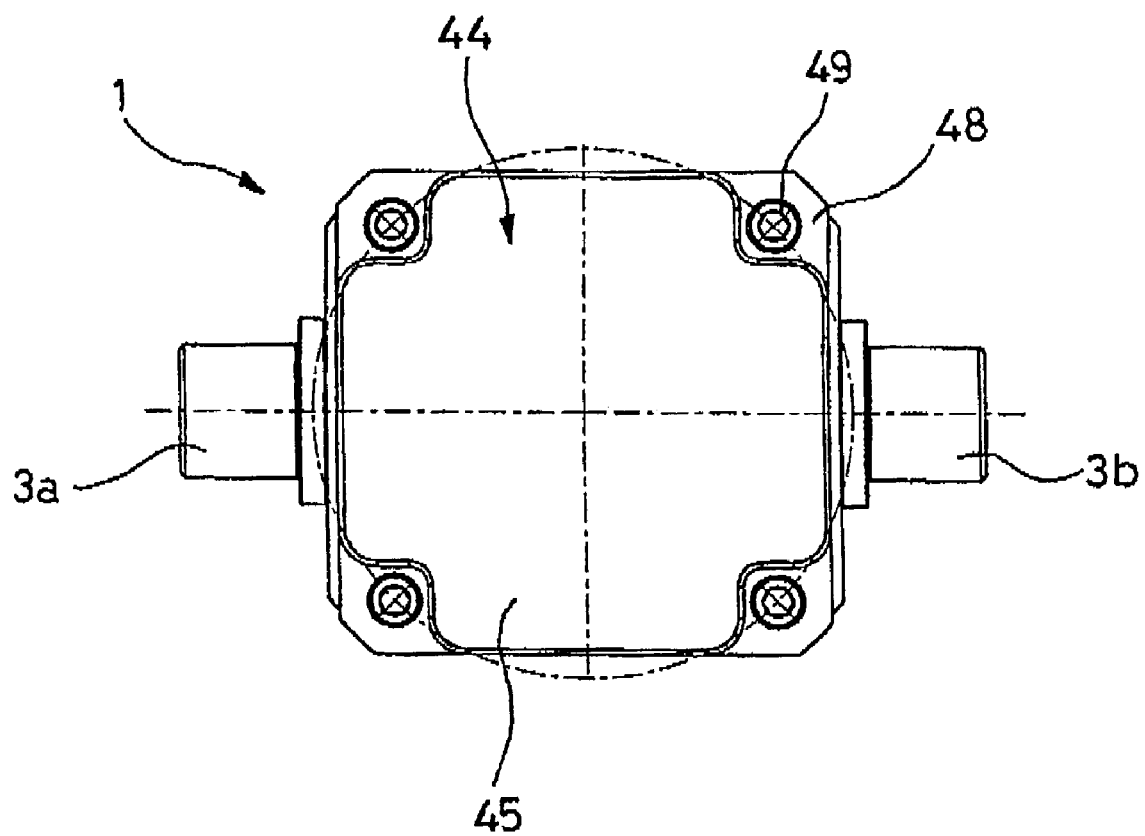

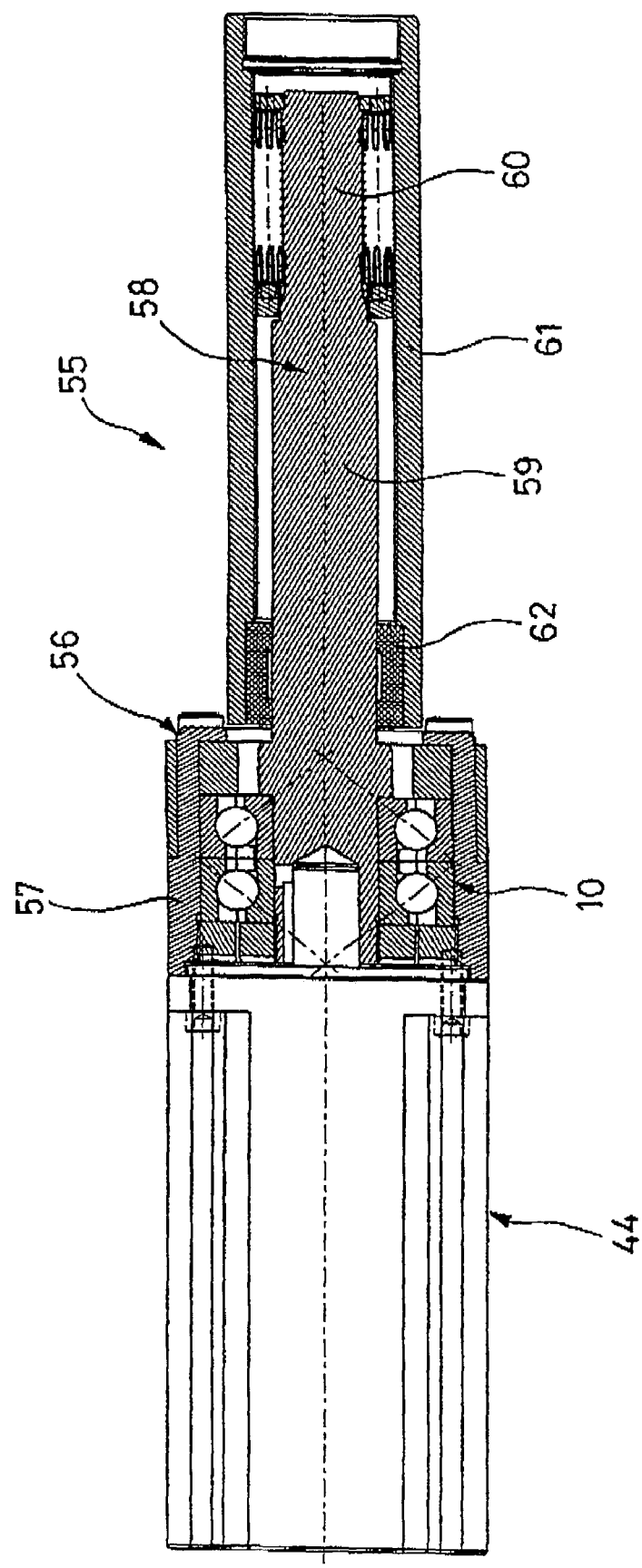
FIG_5

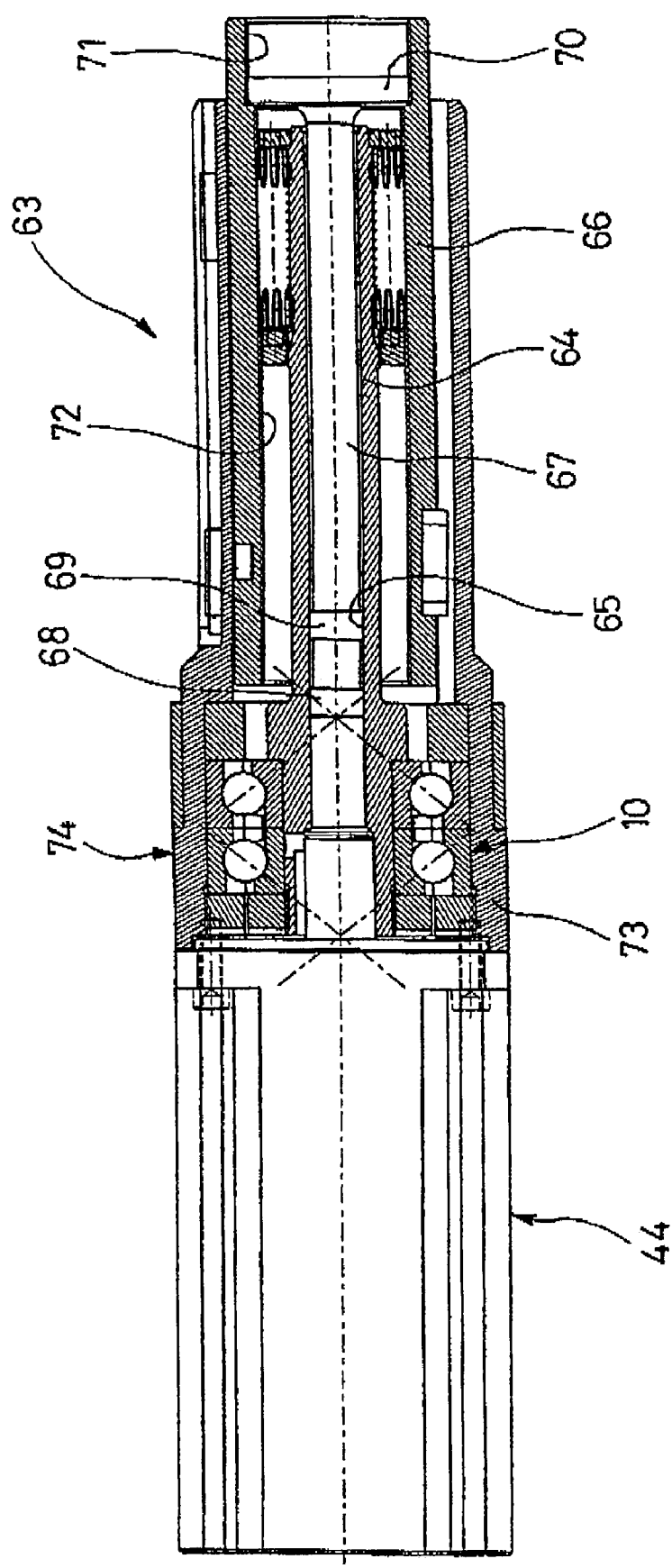
FIG_6

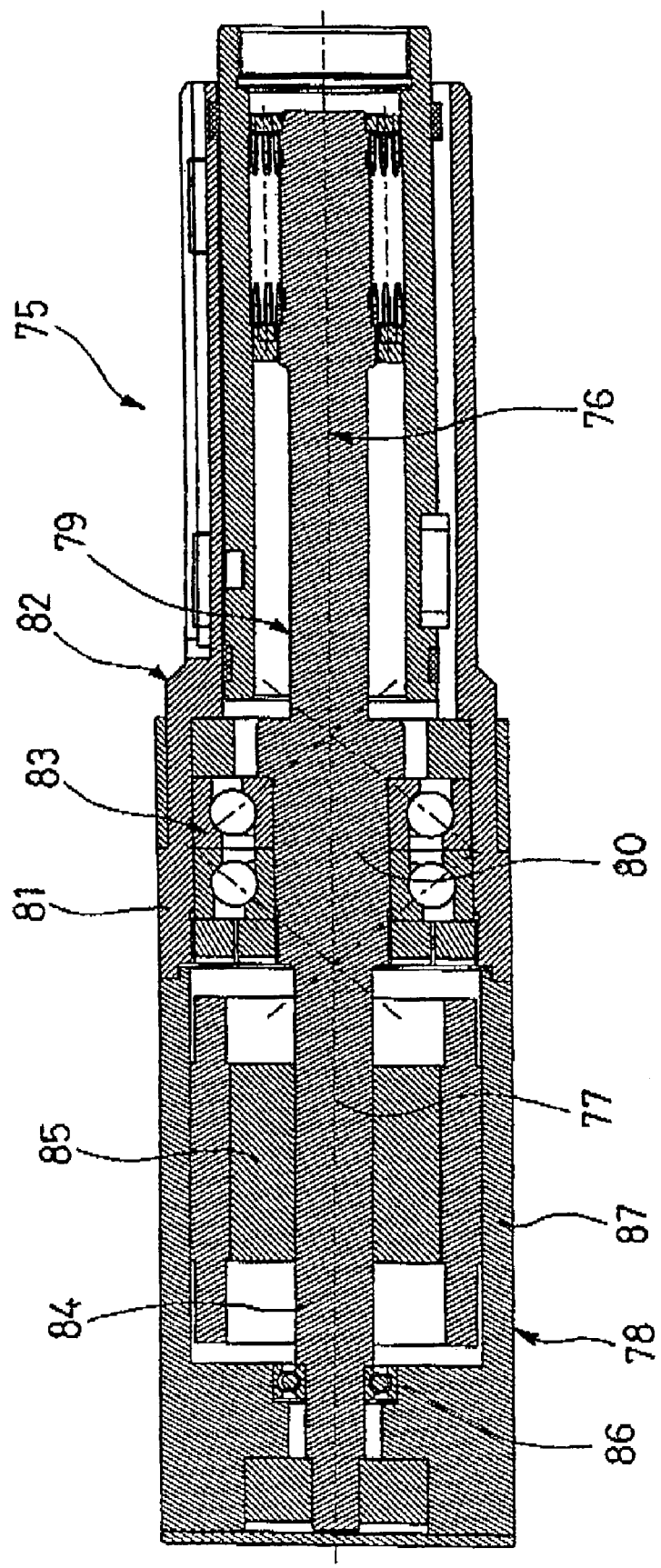
FIG_7

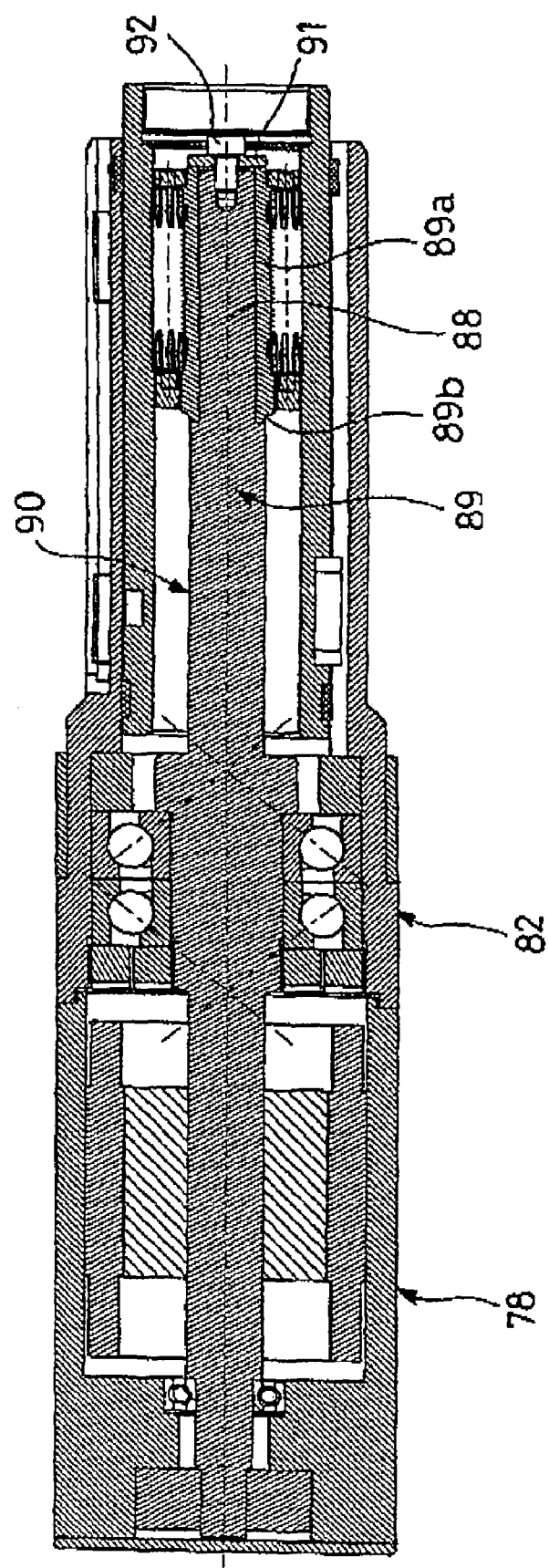
FIG_8

ACTUATOR DEVICE WITH INTERMEDIATE ROLLERS

BACKGROUND OF THE INVENTION

This invention concerns the field of actuator devices, in which the transmission of movement between two longitudinal concentric parts, rotating with respect to one another, is obtained by means of longitudinal rollers, and proposes improvements to such devices.

SUMMARY OF THE INVENTION

The actuator device of the invention comprises a support; a longitudinal drive rod, part of the rear end of which is mounted and rotates inside the said support, and of which a front end section has an external screw thread and, at least on part of its annular section, gear teeth; a longitudinal sheath positioned around and coaxially to the said drive rod and disposing of an internal screw thread; a series of rollers positioned longitudinally between the said drive rod and the said sheath and disposing of an external screw thread engaged with the external screw thread of the said drive rod on the one hand and with the said internal screw thread of the sheath on the other hand, and gear teeth engaged with the gear teeth of the said drive rod; the helix angle of the screw thread already mentioned of the said rollers is equal to the screw thread helix angle of the screw thread of the said drive rod, and different from the helix angle of the screw thread of the said sheath; and a means for the rotational drive of the said drive rod, supported on the said support and whose drive shaft is coupled to the rear end of the drive rod.

According to the invention, the device may advantageously comprise longitudinal guide means connecting the said support to the said sheath.

According to the invention, the device preferably comprises end bushes positioned on either side of the said rollers and disposing of longitudinal bores in which the ends of these rollers are respectively engaged.

According to the invention, the said drive rod preferably comprises two annular sections with gear teeth in between which is situated, at least partially, its previously mentioned screw thread.

According to the invention, the device may advantageously comprise a sliding bush housed by the said sheath and positioned around the part of the said drive rod located between its front and rear sections previously mentioned.

According to the invention, the said sheath preferably comprises a longitudinal guide rod engaged inside a guide bore of the said drive rod.

According to the invention, the said drive rod is preferably mounted inside the said support by means of a bearing bush that also forms the axial stop.

According to the invention, the said drive means preferably comprises a motor whose casing supports the said drive shaft and which is fixed to the said support.

According to one embodiment of the invention, the drive shaft of the said drive means and the said drive rod are aligned and have between them a means of rotational coupling.

According to another embodiment of the invention, the drive shaft of the said drive means and the said drive rod are aligned and are composed of a single part to constitute a drive shaft.

According to the invention, the said drive shaft is preferably mounted and rotates inside the said support by means of a bearing bush that also acts as the axial stop, and at the opposite end of its previously mentioned threaded section, in a casing of the drive means attached to the said support by means of a bearing bush.

In a preferred variant of the invention, the said drive rod is one piece.

In another variant of the invention, the said drive rod comprises a main longitudinal section onto which a sleeve is fitted presenting its previously mentioned screw thread and/or at least a bush presenting its previously mentioned annular section with gear teeth.

According to the invention, the previously mentioned screw thread and the previously mentioned gear teeth preferably have the same external diameter.

According to the invention, the drive rod may have a groove between its previously mentioned screw thread and its annular section with gear teeth.

According to the invention, the gear teeth of the said rollers may be machined in the previously mentioned threaded section.

According to the invention, the device preferably comprises means that forms stops which co-operate with the said end bushes and which are positioned on either side of the longitudinal stack composed by these end bushes and rollers.

BREIF DESCRIPTION OF THE DRAWINGS

This invention will be easier to understand after studying the actuator devices or actuators described by way of non-restrictive examples and illustrated by the drawings in which:

FIG. 1 represents a longitudinal cross section of a first actuator according to the invention;

FIG. 2 represents a longitudinal cross section of an enlarged section of the actuator of FIG. 1;

FIG. 3 represents a transversal cross section of the actuator of FIG. 1;

FIG. 4 represents an end view from behind of the actuator of FIG. 1;

FIG. 5 represents a longitudinal cross section of a second actuator according to the invention;

FIG. 6 represents a longitudinal cross section of a third actuator according to the invention;

FIG. 7 represents a longitudinal cross section of a fourth actuator according to the invention;

FIG. 8 represents a longitudinal cross section of a fifth actuator according to the invention.

DESCRIPTION OF THE PREFERRED EMBODIMENTS

By referring to FIGS. 1 to 4, we can see that an actuator 1 is represented that comprises a tubular support 2 which has a longitudinal body 3, whose housing is more or less of square section and a longitudinal cylindrical section 5 which extends the body 3 forwards.

The body 3 has a longitudinal bore 6 that ends on the cylindrical side 5 by an annular shoulder 7.

The actuator 1 has a longitudinal drive rod 8 which extends axially inside the support 2 and whose rear end 9 is carried by the body 3 of the support 2, by means of a bearing bush 10 forming axial stops in both directions.

In the example represented, this bearing bush 10 has two roller bearing 11 and 12 positioned next to one another, and whose external bushes are held in position on the one hand between the shoulder 7 of the body 3 by means of a bush 13 and on the other hand by a bush 14 screwed into a screw thread at the rear of the bore 6, and whose internal bushes are held in position between on the one hand a shoulder 15 at the front of the rear end 9 of the rod 8 and on the other hand by a bush 16 screwed onto a screw thread at the rear end 9 of the rod 8.

The front end 17, located at a distance from its rear end 9, has an external threaded section 18, and, on either side of this screw thread 18, sections with straight gear teeth 19 and 20 separated from the screw thread 18 by annular grooves 21 and 22, the screw thread 18 and the teethed sections 19 and 20 in the example having the same external diameter.

The front end section 17 has, among others, in front of its toothed section 20, an end cylindrical section 23 on which there is an annular groove 23 and, behind the toothed section 19, a cylindrical section 5 on which there is an annular groove 26.

Between the rear end section 9 and the front end of it 17, the longitudinal rod 8 has an intermediate cylindrical section 27 of reduced diameter with respect to the external diameter of the front end section 17.

As can be seen precisely on FIGS. 2 and 3, the actuator 1 has among others a series of longitudinal rollers 28, which are positioned along the front section 17 of the longitudinal rod 8, and which have a screw thread 29 along their length. The screw threads of the rollers 28 are engaged with the screw thread 18 of the longitudinal rod 8. The rollers have, on their ends, on the one hand a section with straight gear teeth 29 engaged with the gear teeth 20 and on the other hand a section with straight gear teeth 30 engaged with the gear teeth 19.

The longitudinal rollers 19 have cylindrical front end sections 31 of reduced diameter, which are respectively engaged in the bores 32 in a front bush 33 mounted around the cylindrical end section 23 of the rod 8, this bush being held in position by an annular flange 34 fitted into the groove 24 of this end section 23.

The longitudinal rollers 28 have among others cylindrical rear sections 35 of reduced diameter, which are engaged in bores 36 in a rear bush 27, mounted around the cylindrical section 25, this bush 37 being held in position by an annular flange 38 fitted into the groove 26 of this cylindrical section 25.

The screw thread 18 of the front end section 17 of the longitudinal rod 8 and the screw threads of the rollers 28 have identical helix angles such that when the assembly formed by the longitudinal rollers 28, and the retaining bushes 33 and 37 rotates around the rod 9, the rollers rotate with respect to the rod 8 without moving longitudinally.

The actuator 1 comprises among others a cylindrical longitudinal sheath 39 that is fitted around and distant from the front end section 17 of the longitudinal rod 8 and the intermediate section 27 and which is engaged inside the cylindrical section 5 of the support 2. The longitudinal sheath 39 has an internal screw thread 40 that is engaged with the screw threads 29 of the longitudinal rollers 28 and which has a different helix angle than that of these screw threads 29.

In the example shown, the cylindrical section 5 of the support 2 has a lower longitudinal guide groove 41 and the sheath 39 has a key 42 on the outside engaged in this groove 41.

Thus, when the longitudinal rod 8 is driven in rotation with respect to the support 2, its rotational movement is transformed into a longitudinal translation movement of the sheath 39 by means of the rollers 28, which rotate around themselves and roll with respect to the rod 8 and the sheath 39.

As can be seen precisely in FIGS. 1 and 4, to drive the longitudinal rod 8 in rotation, the actuator 1 comprises among others an electric motor 44 at the rear that has a longitudinal housing 45 that ahs a front face 46 coupled to a rear face 47 of the body 3 of the support 2. The housing 45 has four front lugs 48 with longitudinal attachment screws passing through them and screwed into the corners of the body 3 of the support 2.

The electric motor 44 has a drive shaft 50, whose front end section 51 is engaged into a longitudinal bore 52 located in the rear of the rear end section 9 of the longitudinal rod 8, with a key 53 linking the rotation of the drive shaft 50 and the longitudinal rod 8.

In general, the actuator 1 that we have just described above may be fitted between two elements not shown, to be moved longitudinally with respect to one another, the body 3 of the support 2 being fixed to one of the elements for example by means of two opposite pivots 3a and 3b, with the front end of the sheath 39 being fixed to the other, the sheath 39 having for this purpose a threaded section 54 of a larger diameter in its front internal section.

In one variant, where the elements to be moved mentioned above are linked in rotation to one another, the link in rotation and the longitudinal guide between the support 2 and the sheath 39, obtained by the groove 41 and the key 42, may be eliminated.

Referring to FIG. 5, we can see that an actuator 55 is represented that is differentiated from the actuator 1 described in reference to FIGS. 1 to 4 essentially by the following points.

Its support 56 only has one body 57 corresponding to the body 3 of the support 2, the front cylindrical section 5 of the latter being eliminated.

Its longitudinal drive rod 58 has an intermediate cylindrical section 59 whose diameter is greater than the external diameter of its front end section 60.

Its longitudinal sheath 61 is cylindrical and houses in an unthreaded bore at the rear a sliding intermediate bush 62 which surrounds and bears on the intermediate cylindrical section 59.

In this example, the sheath 61 is not blocked in rotation with respect to the support 56, this blockage can be ensured by the elements to be moved to which they are fixed, as described above.

Referring to FIG. 6, it can be seen that an actuator 63 is represented that is differentiated from the actuator 1 described in reference to FIGS. 1 to 4 by the following points.

Its longitudinal drive rod 64 has a cylindrical bore 65 in which a longitudinal guide rod 67 is engaged from the front, this rod having at its rear protruding annular sections 68 and 69 in contact with the bore 65. This guide rod 67 has a front section 70 of larger diameter which is positioned in front of the front end of the drive rod 64 and which for example is screwed into a threaded bore 71 at the front of the longitudinal sheath 66, this screw thread having a larger diameter than the internal screw thread 72 of this sheath corresponding to the screw thread 40.

The guide rod 67 helps with the longitudinal guidance of the sheath 66 when the latter moves away from the body 73 of its support 74.

Referring to FIG. 7, it can be seen that an actuator 75 is represented that is differentiated from the actuator 1 described in reference to FIGS. 1 to 4 essentially by the fact that its drive rod 76 and the drive shaft 77 of its electric motor 78 are made of a single part which forms the drive shaft 79.

This drive shaft 79 comprises a middle section 80 that is supported by the body 81 of its support 82 by means of a roller bearing 83, which corresponds to the roller bearing 10.

The drive shaft 10 has a longitudinal cylindrical rod 84 at the rear which has a smaller diameter with respect to its middle section 80 and which carries the coil of the rotor 85 of the motor 78, a roller bearing 86 being positioned between the rear end section of the cylindrical rod 84 and the rear section of the housing 87 of the motor 78.

From a practical point of view and for the following constructive elements, the drive shaft 79 can be fitted through the support 82 by means of a roller bearing 23, the rotor 85 mounted on the rear rod 84 of the drive shaft 79, outside of the support 82, the roller bearing 86 and the housing 87 fitted and then the housing 87 fixed to the body 81 of the support 82.

Referring to FIG. 8, it can be seen that an actuator 87 is represented that is differentiated from the one represented in FIG. 7 and described above essentially by the fact that the front end section 88 of the drive rod 89 of its drive shaft 90 has a cylindrical sleeve 91 added to the outside on which are located the screw thread 18, the drive teeth 19 and 20, the grooves 21 and 22, the cylindrical sections 23 and 25 and the grooves 24 and 25 of the front end section 17 of the drive rod 8 of the example described in reference to FIGS. 1 to 3, this added sleeve 91 being for example mounted around a section 89a of reduced diameter on the end section of the rod 89, and fixed longitudinally between a shoulder 89b of this rod 89 and a front washer 91 held by a screw 92 screwed axially into the end of the rod 89. The added sleeve 91 may be bound or welded to the rod 89.

This invention is not limited to the examples described above. There are many variants possible that are part of the field defined by the appended claims.

What is claimed is:

1. An actuator device, comprising:
   a support body;
   a longitudinal drive rod having a rear end section mounted and rotating inside said support body and having an external screw thread;
   a means for the rotational drive of said drive rod, supported by said support body and having a drive shaft coupled to the rear end of the drive rod;
   a longitudinal sheath positioned around and coaxially to said drive rod and having an internal screw thread;
   a series of rollers positioned longitudinally between said drive rod and said sheath and having an external screw thread engaged with the external screw thread of said drive rod and with the internal screw thread of said sheath for producing a relative movement of the sheath with respect to the drive rod;
   said rollers and said drive rod having gear teeth coupled together;
   said drive rod having a rear end section mounted and rotating inside said support body;
   said drive rod having a front end section distant from the rear end section thereof and carrying said external screw thread thereof and said gear teeth thereof;
   the helix angle of the screw thread of said rollers being equal to the helix angle of said screw thread of said drive rod and being different from the helix angle of said screw thread of said sheath,
   whereby, when the drive rod is driven in rotation by the rotating drive means and the sheath is retained in rotation, the rotation movement thereof is transformed into a longitudinal movement of the sheath by means of the rollers which rotate around themselves and roll with respect to the drive rod and the sheath, without longitudinal movement of the rollers with respect to the drive rod.

2. Device of claim 1, further comprising a longitudinal guide means (41, 42) connecting said support body (3) to said sheath (39).

3. Device of claim 1, further comprising end bushes (33, 37) positioned on either side of said rollers and including of longitudinal bores in which the ends of these rollers are respectively engaged.

4. Device of claim 3, further comprising annular flanges (34, 38) that form stops which co-operate with said end bushes and which are positioned on either side of a longitudinal stack composed by said end bushes and said rollers.

5. Device of claim 1, characterised by the fact that said drive rod (8) comprises two annular sections with gear teeth (19, 20) in between which is situated, at least partially, the previously mentioned screw thread of said drive rod.

6. Device of claim 5, characterised by the fact that said drive rod (89) comprises a main longitudinal section onto which a sleeve (91) is fitted presenting the screw thread of said drive rod and/or at least a bush presenting the annular section with gear teeth.

7. Device of claim 5, characterised by the fact that said drive rod (8) has at least one groove (21) between the screw thread and the annular section with gear teeth.

8. Device of claim 1, characterised by the fact that said drive means comprises a motor (44) whose casing (45) supports said drive shaft (51) and which is fixed to said support body (2).

9. Device of claim 1, characterised by the fact that the drive shaft (50) of said drive means and said drive rod (8) are aligned and have between them a means of rotational coupling (53).

10. Device of claim 1, characterised by the fact that the drive shaft of said drive means and said drive rod (76) are aligned and are composed of a single part to constitute a drive shaft (79).

11. Device of claim 10, characterised by the fact that said drive shaft (79) is mounted and rotates inside said support body (82) by means of a bearing bush (83) that also acts as the axial stop, and at the opposite end of the threaded section of the drive rod, in a casing (87) of the drive means attached to said support by means of a bearing bush (86).

12. Device of claim 1, characterised by the fact that said drive rod (8) is one piece.

13. Device of claim 1, further comprising a sliding bush (62) housed by said sheath and positioned around the part of said drive rod located between the front and rear sections of said drive rod.

14. Device of claim 1, characterised by the fact that the screw thread and the gear teeth of said drive rod (8) have the same external diameter.

15. Device of claim 1, characterised by the fact that said sheath comprises a longitudinal guide rod (67) engaged inside a guide bore (67) of said drive rod (64).

16. Device of claim 1, characterised by the fact that the gear teeth of said rollers are machined in the threaded section of the drive rod.

17. Device of claim 1, characterised by the fact that said drive rod (8) is mounted inside said support body by means of a bearing bush (10) that also forms the axial stop.

18. The actuator of claim 1, further comprising:
   a longitudinal section (5) extending said support body around said sheath, said longitudinal section having a groove (41); and a key (42) located on an outside of said sheath,
said key engaged in said guide groove.

19. An actuator device, comprising:

a support;

a longitudinal drive rod having a rear end section mounted and rotating inside said support, said drive rod having an external screw thread;

a rotation drive for rotational driving of said drive rod, the rotation drive supported by said support and having a drive shaft coupled to the rear end of the drive rod;

a longitudinal sheath positioned around and coaxially to said drive rod, the sheath having an internal screw thread;

a series of rollers positioned longitudinally between said drive rod and said sheath and having an external screw thread engaged with the external screw thread of said drive rod and with the internal screw thread of said sheath for producing a relative movement of the sheath with respect to the drive rod;

said rollers and said drive rod each having gear teeth coupled together;

said drive rod having a rear end section mounted and rotating inside said support body;

said drive rod having a front end section distant from the rear end section, said front end section carrying said external screw thread of the drive rod and said gear teeth of the drive rod;

the helix angle of the screw thread of said rollers being equal to the helix angle of said screw thread of said drive rod and being different from the helix angle of said screw thread of said sheath, wherein, when the drive rod is driven in rotation by the rotation drive and the sheath is retained in rotation, the rotation movement thereof is transformed into a longitudinal movement of the sheath by means of the rollers which rotate around themselves and roll with respect to the drive rod and the sheath, without longitudinal movement of the rollers with respect to the drive rod.

20. An actuator device, comprising:

a support;

a motor carried by the support and having a shaft;

a longitudinal drive rod having a rear end section spaced apart from a front end section, said drive rod having an external screw thread;

the rear end section directly mounted and rotating inside said support and coupled to the shaft of the motor;

a longitudinal sheath positioned around and coaxially to said drive rod, the sheath having a long internal screw thread;

a series of rollers positioned longitudinally between said drive rod and said sheath and having an external screw thread engaged with the external screw thread of said drive rod and with the internal screw thread of said sheath for producing a relative movement of the sheath with respect to the drive rod;

said rollers and said front end section of said drive rod having gear teeth coupled together;

said front end section carrying said external screw thread of the drive rod and said gear teeth of the drive rod;

the helix angle of the screw thread of said rollers being equal to the helix angle of said screw thread of said drive rod, and the rollers roll around the drive rod by effect of the gear teeth and without longitudinal movement with respect to the drive rod;

the helix angle of the screw thread of said rollers being different from the helix angle of said screw thread of said sheath, and the rotation movement of the drive rod is transformed into a longitudinal movement of the sheath retained in rotation, wherein, when the drive rod is driven in rotation by the rotation drive and the sheath is retained in rotation, the rotation movement thereof is transformed into a longitudinal movement of the sheath by the rollers rotating around themselves and rolling with respect to the drive rod and the sheath, without longitudinal movement of the rollers with respect to the drive rod.

* * * * *